United States Patent
Ledet

(10) Patent No.: US 9,613,130 B1
(45) Date of Patent: *Apr. 4, 2017

(54) METHOD AND APPARATUS OF OBTAINING AND ORGANIZING RELEVANT USER DEFINED INFORMATION

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,794

(22) Filed: Apr. 29, 2015

Related U.S. Application Data

(63) Continuation of application No. 12/888,565, filed on Sep. 23, 2010, now Pat. No. 9,047,381.

(60) Provisional application No. 61/317,817, filed on Mar. 26, 2010, provisional application No. 61/317,535, filed on Mar. 25, 2010, provisional application No. 61/317,541, filed on Mar. 25, 2010, provisional application No. 61/317,788, filed on Mar. 26, 2010, provisional application No. 61/317,805, filed on Mar. 26, 2010, provisional application No. 61/354,307, filed on Jun. 14, 2010, provisional application No. 61/358,035, filed on Jun. 24, 2010, provisional application No. 61/362,947, filed on Jul. 9, 2010, provisional application No. 61/370,584, filed on Aug. 4, 2010, provisional application No. 61/370,574, filed on Aug. 4, 2010, provisional application No.
(Continued)

(51) Int. Cl.
*G06F 17/30* (2006.01)

(52) U.S. Cl.
CPC .. *G06F 17/30598* (2013.01); *G06F 17/30663* (2013.01); *G06F 17/30864* (2013.01)

(58) Field of Classification Search
CPC .......... G06F 17/30088; G06F 17/3053; G06F 17/3082; G06F 17/30861; G06F 17/30864; G06F 17/30663; G06F 17/30705; G06F 17/30713; G06F 17/30477; G06F 17/30554; G06F 17/30696; G06F 17/30707; G06F 17/3071; G06F 17/30867; G06F 17/30598; H04L 51/32
USPC ....... 707/770, 723, 730, 731, 737, 748, 750, 707/752, 769
See application file for complete search history.

(56) References Cited

U.S. PATENT DOCUMENTS

| 2007/0027902 | A1* | 2/2007 | Ponte | G06F 17/30864 |
| 2008/0133487 | A1* | 6/2008 | Gross | G06F 17/30864 |

(Continued)

*Primary Examiner* — Evan Aspinwall
(74) *Attorney, Agent, or Firm* — Haynes and Boone, LLP

(57) ABSTRACT

A method and apparatus of organizing user requested data is disclosed. One example method may include transmitting a query message to a remote site to obtain the user requested data, receiving a response data based on the query message, the response data may include at least a portion of the user requested data. The method may also include storing the response data in a temporary data file memory location, processing the response data in the temporary data file, storing said at least a portion of the user requested data in a permanent data file, and presenting the permanent data file contents to the user. The user may have the capability of receiving numerous messages in a single interface and expanding those messages of interest to review the original message information.

20 Claims, 10 Drawing Sheets

Related U.S. Application Data

61/379,066, filed on Sep. 1, 2010, provisional application No. 61/379,049, filed on Sep. 1, 2010.

(56) References Cited

U.S. PATENT DOCUMENTS

| | | | | |
|---|---|---|---|---|
| 2011/0113349 A1* | 5/2011 | Kiciman | ............... | G06F 17/241 715/753 |
| 2011/0154376 A1* | 6/2011 | Consul | .............. | G06F 17/30861 719/328 |

* cited by examiner

| Weight | Category | Sender | Time Stamp | Site | Body |
|---|---|---|---|---|---|
| 2 | Programming | Josh Adams | 09082009 1412 | Facebook | It's worth noting that Red Hat Enterprise Linux (RHEL) 5 has had an update to MySQL in the last month. This naturally means that CentOS 5 also had a similar update Originally posted here: MySQL in RHEL5/CentOS5 gets an update... |
| 1 | Cell phone | Kevin Stewart | 09282009 1337 | Palm Pre Blog | After all it was just a bad call by thestreet.com analyst. Glad to hear from a number of sources that the Pre is still coming to Verizon Wireless. Maybe I was just too emotional after reading the reported rumor. Now everything seems to be clear up ... |
| 3 | Theme park | John Allison | 10112008 0211 | Facebook | The Orlando Sentinel has turned its industry observer eye on the local economy drivers — the theme parks. The question is with all the cuts going on at the theme parks have they gone too far, cut bone instead ... |

SAMPLE PERMANENT DATA FILE (PDF) CONTENTS

METHOD AND APPARATUS OF OBTAINING AND ORGANIZING RELEVANT USER DEFINED INFORMATION

CROSS-REFERENCE TO RELATED APPLICATIONS

This application is a continuation of application Ser. No. 12/888,565, entitled "METHOD AND APPARATUS OF OBTAINING AND ORGANIZING RELEVANT USER DEFINED INFORMATION", which was filed on Sep. 23, 2010, which claims priority to an earlier filed U.S. Provisional Application Ser. No. 61/317,817 entitled "LIMIT AND FILTER INCOMING DATA PRESENTED TO A USER", which was filed on Mar. 26, 2010, and U.S. provisional Application Ser. No. 61/317,535, filed on Mar. 25, 2010 and U.S. Provisional Application Ser. No. 61/317,541, filed on Mar. 25, 2010 and U.S. Provisional Application Ser. No. 61/317,788, filed on Mar. 26, 2010 and U.S. Provisional Application Ser. No. 61/317,805, filed on Mar. 26, 2010 and U.S. Provisional Application Ser. No. 61/354,307, filed on Jun. 14, 2010 and U.S. Provisional Application Ser. No. 61/358,035, filed on Jun. 24, 2010 and U.S. Provisional Application Ser. No. 61/362,947, filed on Jul. 9, 2010 and U.S. Provisional Application Ser. No. 61/370,584, filed on Aug. 4, 2010 and U.S. Provisional Application Ser. No. 61/370,574, filed on Aug. 4, 2010 and U.S. Provisional Application Ser. No. 61/379,066, filed on Sep. 1, 2010 and U.S. Provisional Application Ser. No. 61/379,049, filed on Sep. 1, 2010, and relates to commonly assigned U.S. application Ser. No. 12/505,109, filed on Jul. 17, 2009, which issued as U.S. Pat. No. 8,280,780 on Oct. 2, 2012, and U.S. application Ser. No. 12/511,112, filed on Jul. 29, 2009 and U.S. application Ser. No. 12/770,981, filed on Apr. 30, 2010, each of which is incorporated herein by reference.

TECHNICAL FIELD OF THE INVENTION

This invention relates to a method and apparatus of providing an information query and organizing process, and, more particularly, to querying online information sources for information based on user preferences, and organizing the information into a graphical user interface for user review.

BACKGROUND OF THE INVENTION

The Internet offers access to the most current information available online across the world. As a result, the world appears to be a smaller place as news and information from across the world is made available to Internet users almost instantly.

Issues often arise with organizing and reducing the amount of incoming information. Internet users desire easy access to the most interesting and updated information. However, computers cannot read a user's mind and provide organized, summarized and filtered data based on the users preferred information presentation format.

Current Internet users receive information from many various information sources. In addition, the information does not regularly come to the user. Instead, the user has to seek the information by navigating to different web addresses and Internet websites. Often, there is overlapping information that could be summarized and filtered prior to being presented to the user. An organized summary of the information would reduce the overflow of information, and provide a simpler way for the user to stay abreast with the information sought.

Having a common information organizational pattern and/or a predetermined time frame (i.e., hourly/daily/weekly/monthly) that is used to present information to users would reduce the amount of time and effort users would spend obtaining Internet information manually. By including user predefined organizational and presentation criteria would also reduce confusion and offer end users search aids and presentation formats with reduced user time and energy.

SUMMARY OF THE INVENTION

One example embodiment of the present invention may include a method of organizing user requested data, the method may include transmitting a query message to a remote site to obtain the user requested data, and receiving a response data based on the query message, the response data including at least a portion of the user requested data. The method may also include storing the response data in a temporary data file memory location, processing the response data in the temporary data file, storing said at least a portion of the user requested data in a permanent data file, and presenting the permanent data file contents to the user.

Another example embodiment of the present invention may include an apparatus configured to organize user requested data. The apparatus may include a transmitter configured to transmit a query message to a remote site to obtain the user requested data, and a receiver configured to receive a response data based on the query message, the response data including at least a portion of the user requested data. The apparatus may also include a memory configured to store the response data in a temporary data file memory location, and a processor configured to process the response data in the temporary data file, store said at least a portion of the user requested data in a permanent data file, and present the permanent data file contents to the user.

BRIEF DESCRIPTION OF THE DRAWINGS

FIG. 3 illustrates an example user data feedback GUI, according to example embodiments of the present invention.

DETAILED DESCRIPTION OF THE INVENTION

Figure 1:
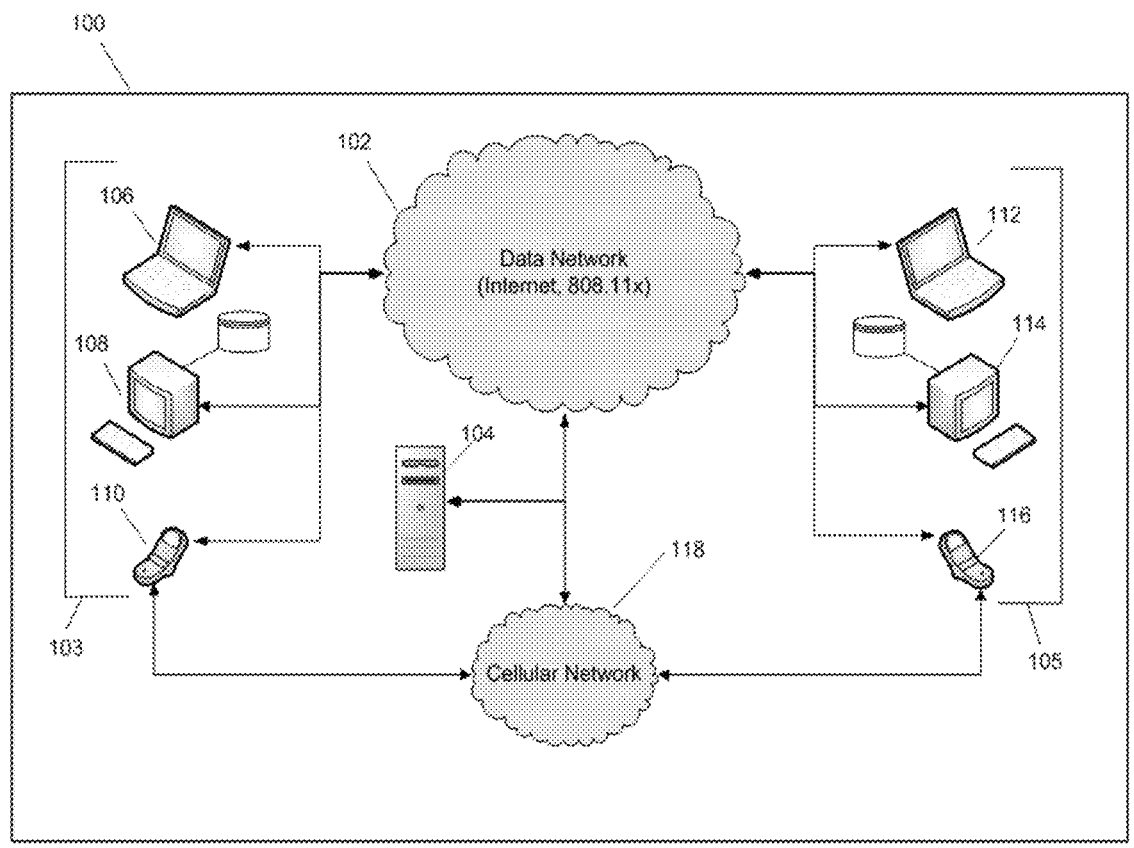
FIG. 1 illustrates an example network configuration, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

One example of organizing Internet-originated information, may include messaging filters used to filter out messages received in an email application. These filters match text in the message body, the message subject, and/or other portions of an overall message and perform a corresponding action. For example, actions may include sending the email to another user, marking the message as read, etc. Once the messages are received, certain messages are pooled together into a single viewable window, which provides the user with the ability to interact with any or all of the messages at once.

Instead of requiring a user to seek the information manually, each time information is desired, an application may be used that automatically searches predetermined web addresses and other online information sources. Such an automated information searching application raises intuitiveness, and allows less effort from the user to obtain the desired information. Adding the ability to categorize and organize the obtained information increases the intuitiveness of the application and provides the user with organized data while the "busy work" is performed without user supervision.

According to example embodiments of the present invention, the user can receive (automatically) a limited amount of incoming information from many different sources, such as, web sites, blogs, social networking sites, etc. According to one example, the user may have the incoming data pooled together as the data is received from different sources. Instead of retrieving and/or viewing the messages one at a time by visiting the various blogs and web sites manually one at a time, the user is able to receive the various messages and have them pooled together prior to presenting the data to the user. Various options presented on the user's interface or graphical user interface (GUI) permit the user to further select, modify and interact with the data in a manner prescribed by the user's preferences.

FIG. 1 illustrates an example communication network 100, according to example embodiments of the present invention. Referring to FIG. 1, a user may be utilizing a client machine 103 to access an application corresponding to the present invention. Such a client machine 103 may be any of a mobile laptop device 106, a personal desktop computer 108, or a wireless device or mobile station 110. The client machine 103 is connected to a data network, such as, the Internet 102 via a wired or wireless communication link.

According to example embodiments of the present invention, application software may be downloaded from a remote server 104 and installed on the client's machine 103. For example, it may be assumed that the application resides on the server 104, but could instead reside in a distributed manner on one or more of the devices or networks illustrated in FIG. 1.

In operation, the user will access the client machine 103 and connect to a remote machine 105, which may include any of a mobile laptop device 112, a personal desktop computer 114, and/or a wireless device or mobile station 116. The remote machine 105 may be connected to the Internet 102. In one example, if the user is operating a mobile station 110/116, the server 104 can be accessed via the Internet 102 and/or a wireless network, such as, a cellular network 118. It should be noted that other types of devices, in addition to devices 103 and 105, might be used with the present invention. For example, a personal digital assistant (PDA), an MP3 player, a gaming device/controller, such as, a hand-held device or home-based device that can also transmit and receive information.

In operation, in order to receive data from the user's selected sites, the application of the present invention may query data from the user's predetermined websites. The sites could be of various types including, for example, social networking sites, short messaging sites, blogging sites, as well as other different information sources and/or sites.

Examples of the software programming used to obtain data from each of the various types of sites are provided below. The user may determine how often the query is made in the configuration of the application. The user's configuration may be performed, for example, in a GUI window presented to the user. These GUI windows allow the user to set the time intervals of when the application will search and access each of the sites and receive an update on the user's remote entries that are "pulled" into the application at the prescribed time intervals.

Figure 2:
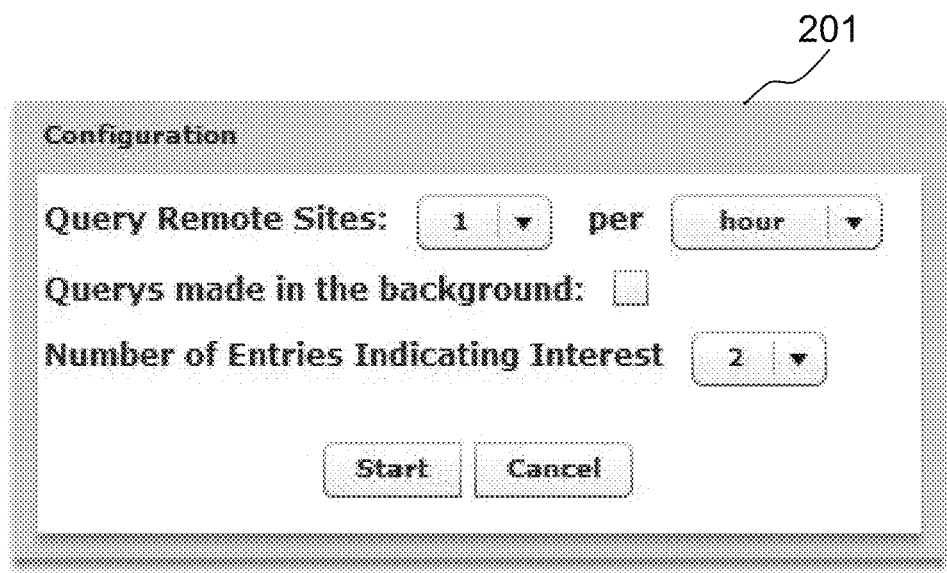
FIG. 2 illustrates an example user input GUI, according to example embodiments of the present invention.

FIG. 2 illustrates an example screenshot GUI 201, according to example embodiments of the present invention. Referring to FIG. 2, an example configuration GUI is presented. This window allows the configuration of when to send the queries to the remote sites, whether or not the queries are made when the application is not running, and the number of entries encountered before the application assumes that there is a definite interest to the user. The first line in the configuration window is a way for the user to indicate the timeframe to when the query message will be sent to the sites. The options may be [1, 2, 3, 4] times per [hour, day, week, month], etc. These dropdown menu elements can be further modified without deviating from the scope of the invention.

The second line in the configuration window of GUI 201 determines whether the queries can be sent when the application is not being executed. If this checkbox is selected, a background process may be started initiating the queries to be generated and sent to obtain user desired information. A process can be started in the background of the user's device that runs at all times, or, alternatively, may be initiated intermittently during the regular operation of the user device.

Current programming languages contain classes and managers necessary to implement the starting and monitoring of background processes. Managers allow the programming of background processes that can be setup to use a specific ratio of CPU processing for registered processes. The background process can also be initiated in a batch file that is executed prior to the initialization of the application.

Inside the batch file, the background process may be initiated by using a command, such as, the "Start" command in Windows® which informs the operating system that the application needs to be running in the background, and allows the current window to be used. The process can also be started by associating a symbol or sound with the application. For example, placing the "&" symbol after the application name may initiate the running of the application in the background.

The last line in the configuration window allows the user to indicate the number of entries encountered before the topic is considered a topic of definite interest. The choices in the dropdown list may include [2, 3, 4, 5, 6, 7, 8, 9], but can instead be any number that the user desires.

Social networking sites may provide user desired entries from corresponding social networking applications, for instance Facebook, LinkedIn, Plaxo, MySpace, etc. may each be utilized by the user as sources of information that may be captured and received in the current application. The information postings displayed on the user's preferred sites, (i.e., the user's "Wall" on Facebook) are also captured by the current invention by utilizing application programming interfaces (APIs) provided by the social networking organization.

An application programming interface (API) is an interface implemented by a software program to enable its interaction with other software. Generally, APIs are implemented by applications, libraries and operating systems to determine the vocabulary and calling conventions. The programmer may employ an API to use various services. It may include specifications for routines, data structures, object classes, and protocols used to communicate between the user and the implementer of the API.

When used in the context of web development, an API is typically a defined set of hypertext transfer protocol (HTTP) request messages along with a definition of the structure of response messages, usually expressed in an extensible markup language (XML) or JavaScript object notation (JSON) format. Web APIs allow the combination of multiple services into new applications.

The practice of publishing APIs has allowed web communities to create an open architecture for sharing content and data between communities and applications. In this way, content that is created in one place can be dynamically posted and/or updated in multiple locations on the web. For example, photos can be shared from sites like Flickr and Photobucket to social network sites like Facebook and MySpace. Content can be embedded, e.g., embedding a presentation from SlideShare on a Linked-In profile. Content can be dynamically posted by sharing live comments made on Twitter to a Facebook account. Video content can be embedded on sites which are served by another host. In addition, user information can be shared from web communities to outside applications, delivering new functionality to the web community that shares its user data via an open API.

Published APIs provide a way to link the user application with applications of social networking sites. For instance, Facebook provides a published API that permits user queries to be performed. One example query may include "message.getThreadsInFolder", which returns all of a user's messages and threads from the user's Inbox. Another example may be "notes.get", which returns a list of all of the visible notes written by the specified user. Another example may be "stream.get", which returns an object in JSON-encoded or XML format that contains the stream from the perspective of a specific viewer, such as, a user of a Facebook page.

Other example query APIs may include "stream.getComments", which returns all comments associated with a post in a user's stream. This function returns comments only if the user who owns the post and published the post to his or her profile has authorized the application to obtain information. Using these, and similar functions, APIs and queries, the application can utilize one of these functions to obtain the comments that are posted on a given user's site, or comments made by other users. Similar application processing may be used to obtain information for each of the social networking applications where the user has an account (MySpace, Twitter, etc).

Blogging websites, such as, Blogger, Iseekblog, Lifestream and other web based blogging sites offer an open API that allows other external GUI applications to interact with their website application. Using these APIs, the application corresponding to the present invention is able to push blogging entries and posts to the user's application interface and/or memory for further processing (organizing, sorting, etc.). For example, to retrieve the blog entries on a particular blog site, the current application sends an HTTP GET request to the blog's feed URL. The blog site then returns a feed containing the appropriate blog entries. For example, to get a list of blog posts for the username/email address "ABCXYZ@gmail.com", the user application will transmit the following HTTP request message to the blog site (with the appropriate value in place of blogID): GET http://www.blogger.com/feeds/blogID/posts/default In response to this query, the following (for example) is returned to the application:

<?xml version='1.0' encoding='utf-8'?>,
<?xml-stylesheet
href="http://www.blogger.com/styles/atom.css"
type="text/css"?>,
<feed xmlns='http://www.w3.org/2005/Atom'
xmlns:gd='http://schemas.google.com/g/2005'
gd:etag='W/"D08FQn8-eip7ImA9WxZbFEw."'>
<id>tag:blogger.com,1999:blog-blogID</id>
<updated>2008-04-17T00:03:33.152-07:00</updated>
<title>Lizzy's Diary</title>
<subtitle type='html'></subtitle>
<link rel='http://schemas.google.com/g/2005#feed'
type='application/atom+xml'
href='http://blogName.blogspot.com/feeds/posts/default'
/>
<link rel='self' type='application/atom+xml'
href='http://www.blogger.com/feeds/blogID/posts/default' />
<link rel='alternate' type='text/html'
href='http://blogName.blogspot.com/' />
<author>
<name>Elizabeth Bennet</name>
<uri>http://www.blogger.com/profile/profileID</uri>
<email>noreply@blogger.com</email>
</author>
<generator version='7.00'
uri='http://www2.blogger.com'>Blogger</generator>

```
<entry                              gd:etag='W/
    "D0YHRn84eip7ImA9WxZUFk8."'>
<id>tag:blogger.com,1999:blog-blogID.post-postID</id>
<published>2008-04-07T20:25:00.005-07:00</pub-
    lished>
<updated>2008-04-07T20:25:37.132-07:00</updated>
<title>Quite disagreeable</title>
<content type='html'><p>I met Mr. Bingley's friend Mr.
    Darcy
This evening. I found him quite
disagreeable.</p></content>
<link rel='edit' type='application/atom+xml'
    href='http://www.blogger.com/feeds/blogID/posts/de-
        fault/postID' />
<link rel='self' type='application/atom+xml'
    href='http://www.blogger.com/feeds/blogID/posts/de-
        fault/postID' />
<link rel='alternate' type='text/html'
    href='http://blogName.blogspot.com/2008/04/quite-dis-
        agreeable.html' />
<author>
<name>Elizabeth Bennet</name>
<uri>http://www.blogger.com/profile/profileID</uri>
<email>noreply@blogger.com</email>
</author>
</entry>
</feed>
```

It is important to note that the various web addresses in the above-noted XML software code and throughout the remainder of this specification are for example purposes only, and are not to be relied on for subjective content or any information not included in this specification. The web addresses are used for example purposes only, and any comparable web address or website could be substituted for the web addresses included in this specification.

FIG. 3 illustrates a response message 301 to a blog query, according to example embodiments of the present invention. Referring to FIG. 3, short messaging service (SMS) sites support messages that are up to a certain number of characters in length, such as, 140 characters. Users who send and receive frequent text messages generally prefer SMS services.

In operation, the short messages are posted on the author's profile page and delivered to the author's subscribers known as followers. Senders of the messages can direct their message to specific individuals, groups, or to everyone linked to receive the author's messages. The data contents of the permanent data file (PDF) may include information, such as, weight, category, sender (author), timestamp, site and body (message contents). The weight may be used to indicate a relevance factor based on the user's predetermined query information.

Like other Internet applications, companies that have SMS applications publish APIs that permit other parties to connect and interact with their users. For example, by configuring an API of a particular site, a user would be able to send and receive the SMS text messages from external applications. One such company is website company Twitter. Twitter has published methods that allow an external application to query for a particular user's messages or "tweets"—what Twitter has named the short message.

An example function that returns messages from a Twitter user is "direct_messages", which returns a list of the most recent direct messages sent to an authenticating user. The XML and JSON versions may include detailed information about the sending and recipient users. Another example function is "since_id", which returns only direct messages with an ID greater than (more recent than) the specified ID. Another example function may be "max_id", which returns only statuses with an ID less than (older than) or equal to the specified ID. Further example functions may include "Count", which specifies the number of statuses to retrieve, which may not be greater than 200. Other example embodiments may include "Page", which specifies the page of direct messages to retrieve. The response is an XML formatted message that will return the specific SMS message(s) queried.

Example embodiments of the present invention may include performing queries user using the "direct_messages" function, and the results from the query are stored in the user application in a temporary text file that is later processed to retrieve the message content. Storing the data entry messages received from the social networking, blogging, and short messaging sites may include storing the information in a temporary file called a temporary data file (TDF). The TDF may be a text-based file that is not persistent in the application, but simply a holding place for processing the newly received messages.

The TDF, once created, is scanned by the user application and converted into indexed/searchable tokens. One such API providing the text to token conversion is the Java package function "org.apache.lucene.analysis". This Package implements tokenization, which may include breaking down input text into small indexing elements or tokens. Some of the other analysis tools included in the Java package function may include, stemming, which replaces the words by their stems. For instance, with English stemming "bikes" is replaced by "bike", now a query for "bike" can find both documents containing "bike" and those containing "bikes." Now the search is broadened to variations of the same root word, thus increasing the efficiency of the query results.

Additional features of the Java package function may include stop words filtering, which removes common words, such as, "the", "and" and "a", which rarely add any value to the content of a query. Removing these words shrinks the index size and increases performance. It may also reduce some unnecessary results often referred to as "noise" and actually enhance search relevancy. Further features may include text normalization, which strips some or all accents and other character markings, which are often disregarded in the English language, and synonym expansion, which adds synonym words automatically at the same token position as the current word to provide more accurate matching when users search with words in the synonym set.

Once the TDF is tokenized and properly formatted, the new data may be merged so that each of the entries are analyzed and a category is determined that corresponds with a main topic of the message entry. This data is then merged with a permanent data file (PDF), which is maintained in the user application as a living data file, or a file that is persistent over multiple executions of the current application.

The format of the PDF is displayed in FIG. 3. FIG. 3 illustrates a table with a sample permanent data file (PDF). The contents of FIG. 3 are an example of the type of data that is stored in the PDF. Other types of data would also be stored in the PDF including certain elements that the user application needs to interact with a specific API utilized to correspond with the remote site(s). This may include, but should not be limited to, the userID of the remote site, the specific userID of the author of the original message, the messageID if one is present and required by the API, and any other information that is required to be sent via parameters of the API.

Weighting the data may be performed based on an internally calculated weight, which is maintained in the PDF to ascertain the number of elements in each of the categories. An entry may increment the weight value if the category of the entry is either an exact match, or closely resembles an existing category. The weight may be the same for all matching categories found in the PDF. The weight can be formulated in any way seen appropriate to the designer and user, but a sample weighting algorithm is illustrated in Table 1 below.

TABLE 1

| WEIGHT | DESCRIPTION |
|---|---|
| 1 | 1-3 SIMILAR ENTRIES FOUND |
| 2 | 4-6 SIMILAR ENTRIES FOUND |
| 3 | OVER 7 ENTRIES FOUND |

The Table 1 weights are assigned to data messages analyzed from the TDF. For example, if it's determined that two of the messages pertain to "baseball." The two messages would be added to the PDF, the category for the two messages would be "baseball", and the weights of the category "baseball" would be incremented by two corresponding to the two messages that include the term "baseball." In another example, if there were three new messages pertaining to "healthcare", those messages would be merged with the PDF. If there were already three existing messages pertaining to healthcare, the weights for all of the "healthcare messages" would be incremented by 2, as there are now a total of 5 healthcare related messages 2 of which are new.

Certain actions may be taken if the weights are found to be within a certain value. For example, if the weight of any category is 3 (noting the above example from Table 1), then the messages within that category may be displayed to the user first, or, only messages with that specific category may be displayed to the user at all, allowing the user to interact with the messages by either simply reading through the entries, or responding to one, many, or all of the messages at one time.

Figure 4:
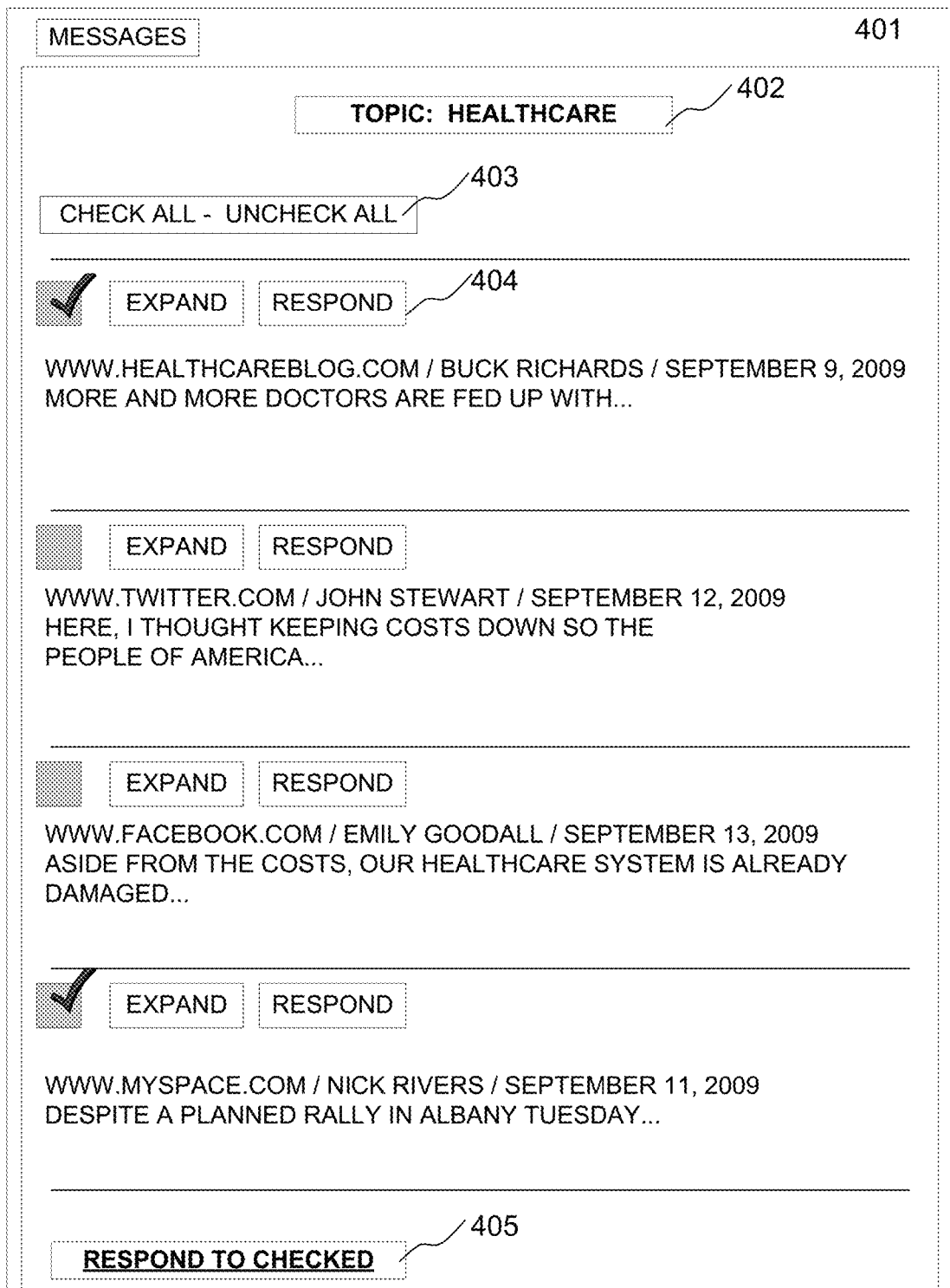
FIG. 4 illustrates another example user data feedback GUI, according to example embodiments of the present invention.

FIG. 4 illustrates messages included in a message interface 401, which are displayed to the user, according to example embodiments of the present invention. The messages are within the category topic of "healthcare" 402, and the messages are not displayed in their entirety, but a summary, or shorter concise version, for example, may be displayed making the window easier to read for the user. The user is able to select the boxes on the left individually or select the two buttons on the top 403 to select or deselect all of the messages. The "Check All" button 403 automatically checks all of the messages, and the "Uncheck All" button deselects all of the messages.

The "Respond to Checked" button 405 on the bottom applies to all of the checked messages. When the button is pressed, a window is displayed allowing the user to type a response that is automatically addresses all the authors of the messages that had the box checked, or, the user may respond directly to a message author by selecting button 404.

Figure 6:
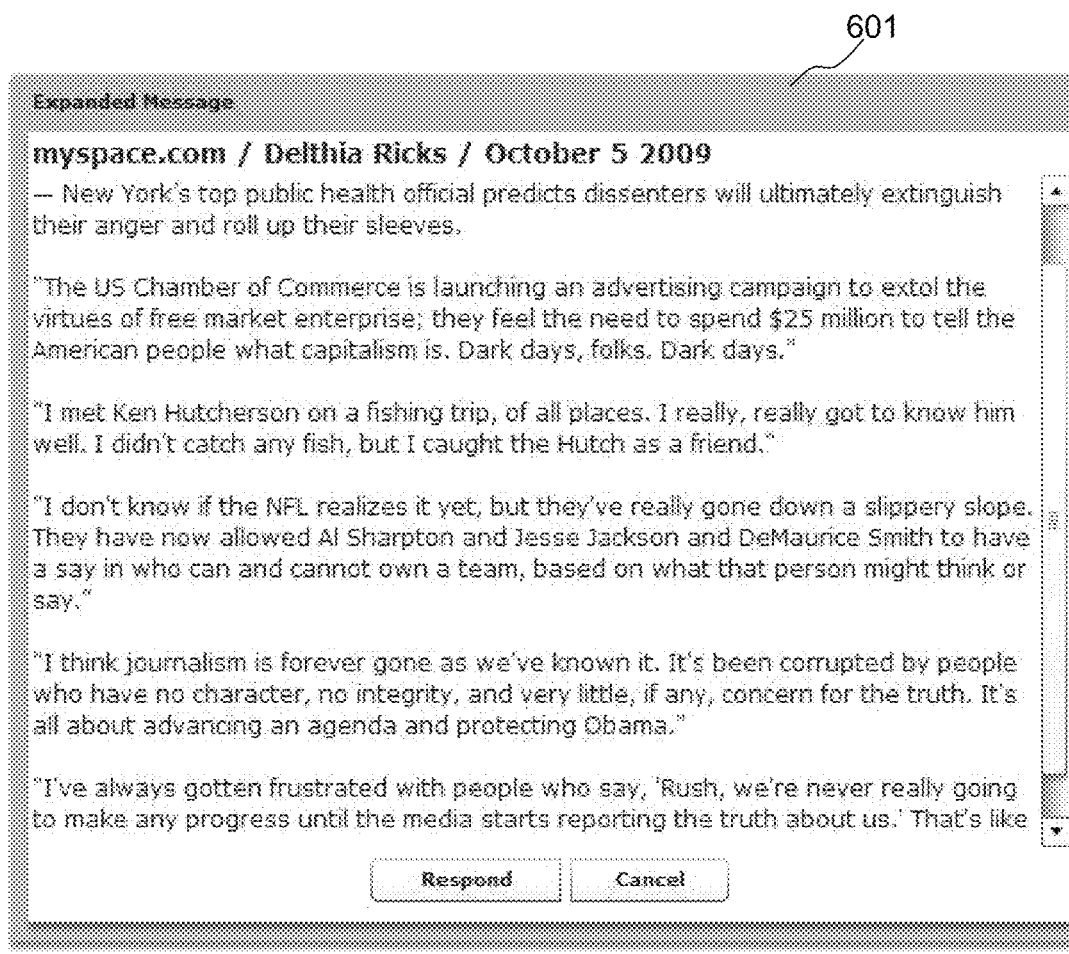
FIG. 6 illustrates another example user data feedback and data presentation GUI, according to example embodiments of the present invention.

In each of the messages illustrated in FIG. 4, there are control buttons on the message area allowing the user to perform functions to interact with the messages. The "Expand" button will open another window displaying the full contents of the message, which also allows the user to respond to the message. FIG. 6 illustrates an example of the expanded message window.

Figure 5:
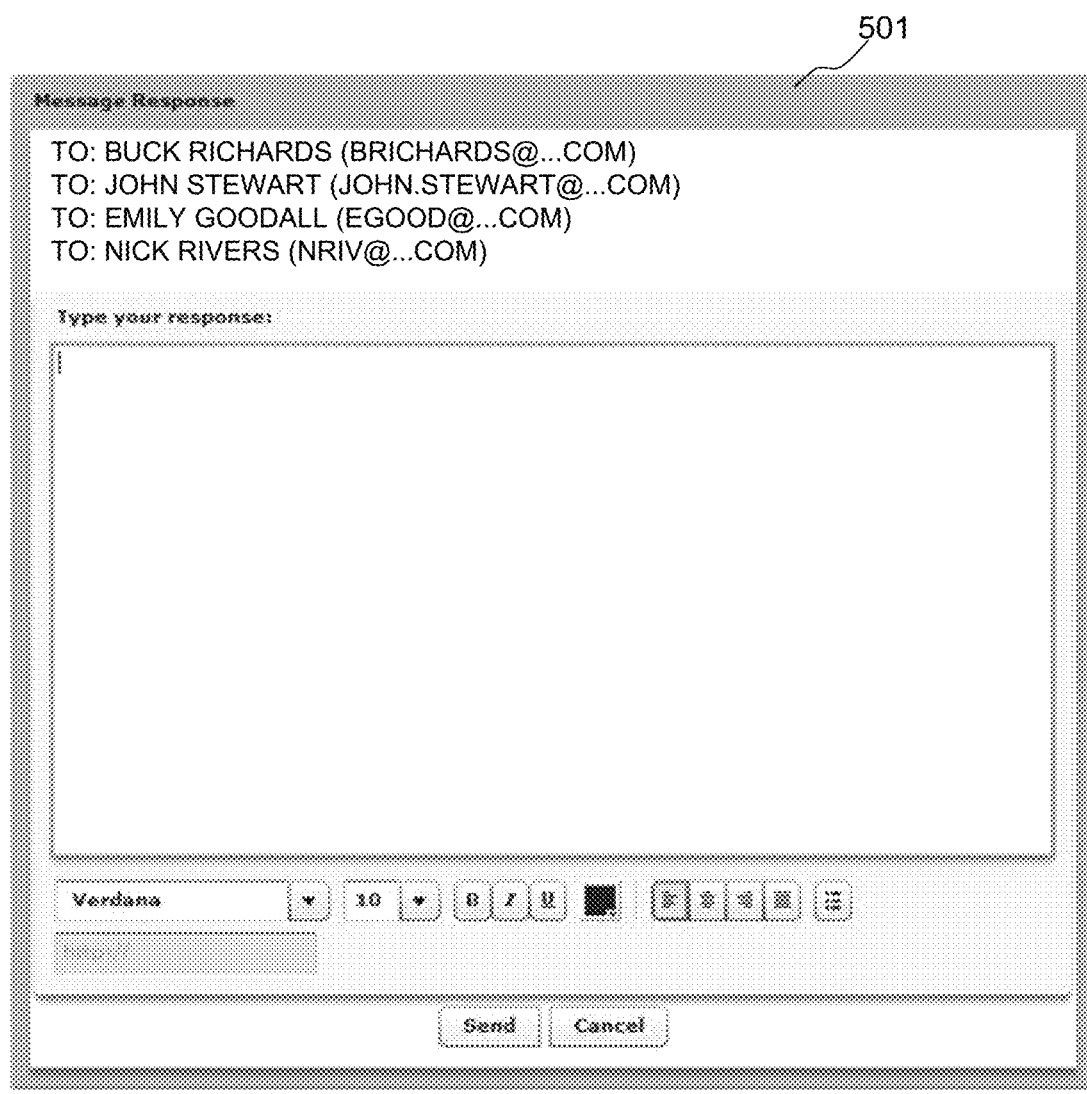
FIG. 5 illustrates an example user data feedback and data presentation GUI, according to example embodiments of the present invention.

FIG. 5 illustrates a message response window 501, according to example embodiments of the present invention. In this example, each of the four message authors included in the GUI of FIG. 4 are named with their corresponding email addresses. The user had all of the checkboxes checked before pressing the "Respond to Checked" button, and thus the top of the window displays all of the message originators, and the response will be sent to all of the addresses listed in the top text area. The message is not simply emailed to the original user, but, utilizing the published APIs for each medium, the message will be sent as a response in that medium.

When the "Send" button is pressed, the text that was typed into the response area is sent to all of the addresses in the top list. The format of the message response depends on the medium that the message is being sent. Sending a response to a social networking site if the original message originated from a social networking site, such as, Facebook, the format of the response may include commands, such as, "facebook->api_client->notifications_send($uid, 'some info', 'to_id')" where "$uid"=application ID of the user application, "some info"=the text that the user has typed into the response window, "to_id"=an array of the recipient ID within the social networking site. This ID would be the originator of the initial message that is being responded to by the user.

According to other example embodiments, sending a response for a Blogger site or to a blog, the user application of the present invention would formulate a response that may create an XML representation to publish the post based on the following example software code.

```
<entry xmlns='http://www.w3.org/2005/Atom'>
    <title type='text'>Healthcare Response</title>
    <content type='xhtml'>
        <div xmlns="http://www.w3.org/1999/xhtml">
            <p> After all it was just a bad call by thestreet.com analyst.
            I cannot assume that the president has that much influence
            already on the market. The healthcare debate has only begun.
            </p>
        </div>
    </content>
    <category scheme="http://www.blogger.com/atom/ns#" term="healthcare" />
    <category scheme="http://www.blogger.com/atom/ns#" term="Joe Duglas" />
</entry>.
```

The information posted by the author will appear as if it was created by the currently authenticated user of the blog. The XML text may be sent in a new POST request using the application/atom+xml content type. Blogger, for example, creates a blog post using the entry that is sent, then returns an HTTP 201 CREATED status code, along with a copy of the new post in the form of an <entry>element. The entry returned is the same that was created, but it may also contain various elements added by Blogger, such as an <id>element.

In the procedure of sending a response for a short message site, it is assumed that the original message was received via a short message site, for example Twitter. The Twitter API supports sending direct messages between a user and followers using the "Services_Twitter_DirectMessages" function. Below is an example of utilizing the "DirectMessages" function to send a Twitter message to a user who is designated a follower.

```
<html>
<head>
```

```
</head>
<body>
    // read form input
    $user=$ POST['user'];
    $pass=$ POST['pass'];
    $to =$ POST['to'];
    $message=$ POST['message'];
    // initialize service object
    $service=new Services_Twitter($user, $pass);
    // create and send direct message to recipient
    $service->direct messages->new($to, $message);
    // perform logout
    $service->account->end session( );
    echo 'Your message was sent!';
}
?>
</body>
</html>.
```

In operation, the above software code script operates by sending a direct message to a specified user via the "Services_Twitter_DirectMessage" function, which accepts two arguments including the recipient's Twitter username, and the message body. In practicality, a first user is only allowed to send messages to other users that the first user follows, or may also be allowed to send messages to other users following the first person. In the procedure of sending a message, a check will be made and an error code will be returned if the recipient is out of bounds.

FIG. 6 illustrates an example GUI of an expanded message view 601, according to example embodiments of the present invention. Referring to FIG. 6, the top portion of the GUI illustrates text that includes the web site of the original entry, the author or originator of the message, and the date of the entry. The entire contents of the message are included in a scrollable text area for the user to review. The "Respond" button will open a new window allowing the user to type a response which is automatically addressed to the author or originator of the message.

Figure 7:
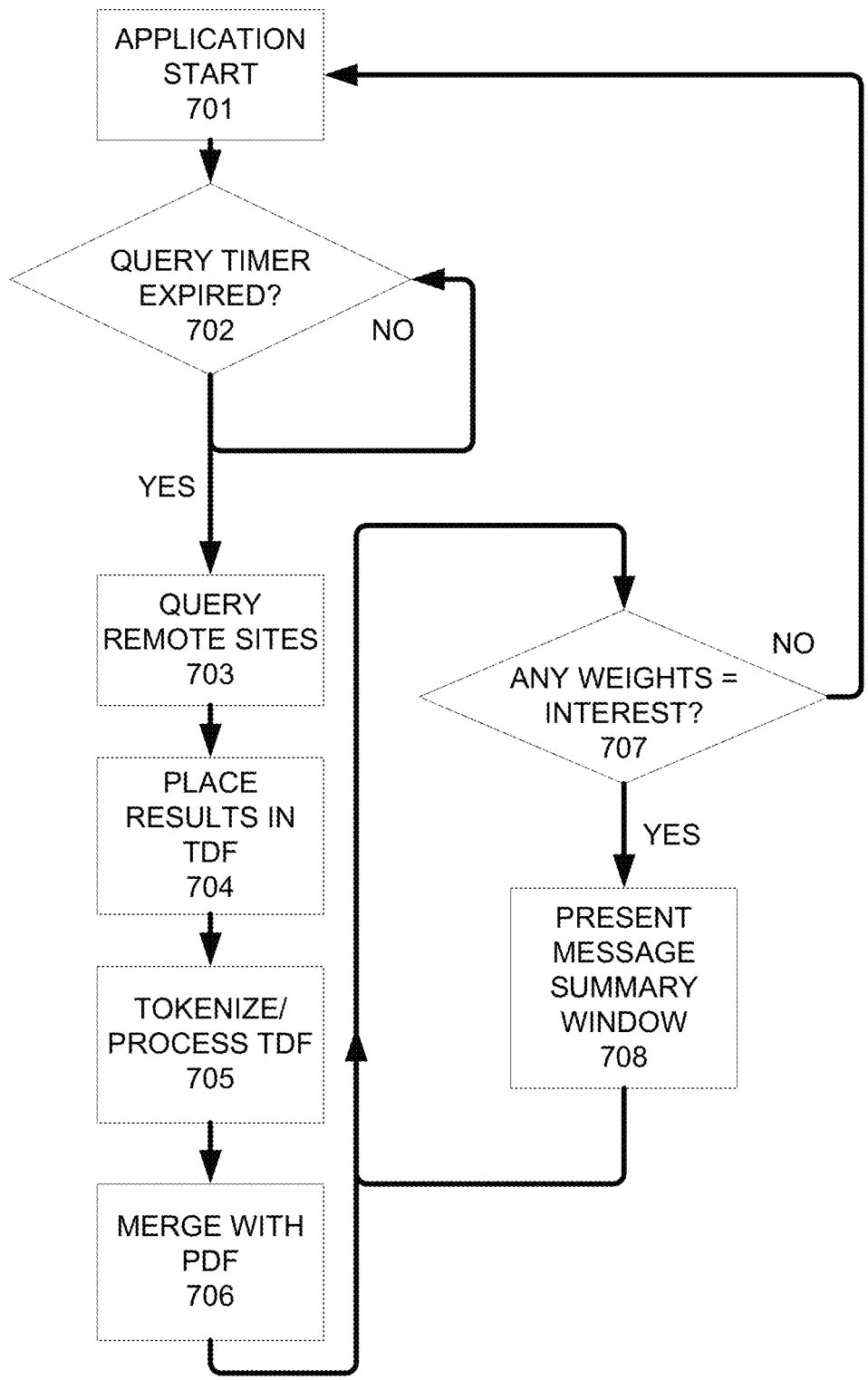
FIG. 7 illustrates an example flow diagram, according to example embodiments of the present invention.

FIG. 7 illustrates a flowchart of the flow of logic operations, according to example embodiments of the present invention. Referring to FIG. 7, the user application begins at operation 701 followed by a determination being made at operation 702 to determine if the timer has expired indicating that a query message will be sent to remote site Operation 702 may be optional and the next operation 703 will execute when the application begins. If the timer has not expired ("NO"), then the timer is again checked. When the timer has expired, a query message is sent to the remote sites(s) at operation 704.

The query message can be of different formats depending on the requirements of the remote sites. The response of the query message may be received by the user application and the results may be placed in a temporary data file (TDF) at operation 704. The TDF is a temporary file used to process the results, which may be converted to tokens and analyzed to determine the categories of each of the entries at operation 705. The processed data from the TDF is merged into a permanent data file (PDF) and the PDF weights are adjusted accordingly at operation 706.

A determination is then made to determine if there are any weights indicating a positive interest of the user at operation 707. The user may indicate the weight that indicates a positive interest in the configuration of the user application. If there are no weights indicating a positive interest of the user, the application returns to the beginning and the query timer is checked. If there are weights indicating a positive interest, then a message window is displayed at operation 708 to the user, allowing the user to interact with the entries and respond to any or all of the entries. Once the user is complete interacting with the messages, the application checks if there are any other weights in the PDF indicating a positive interest of the user.

Figure 8:
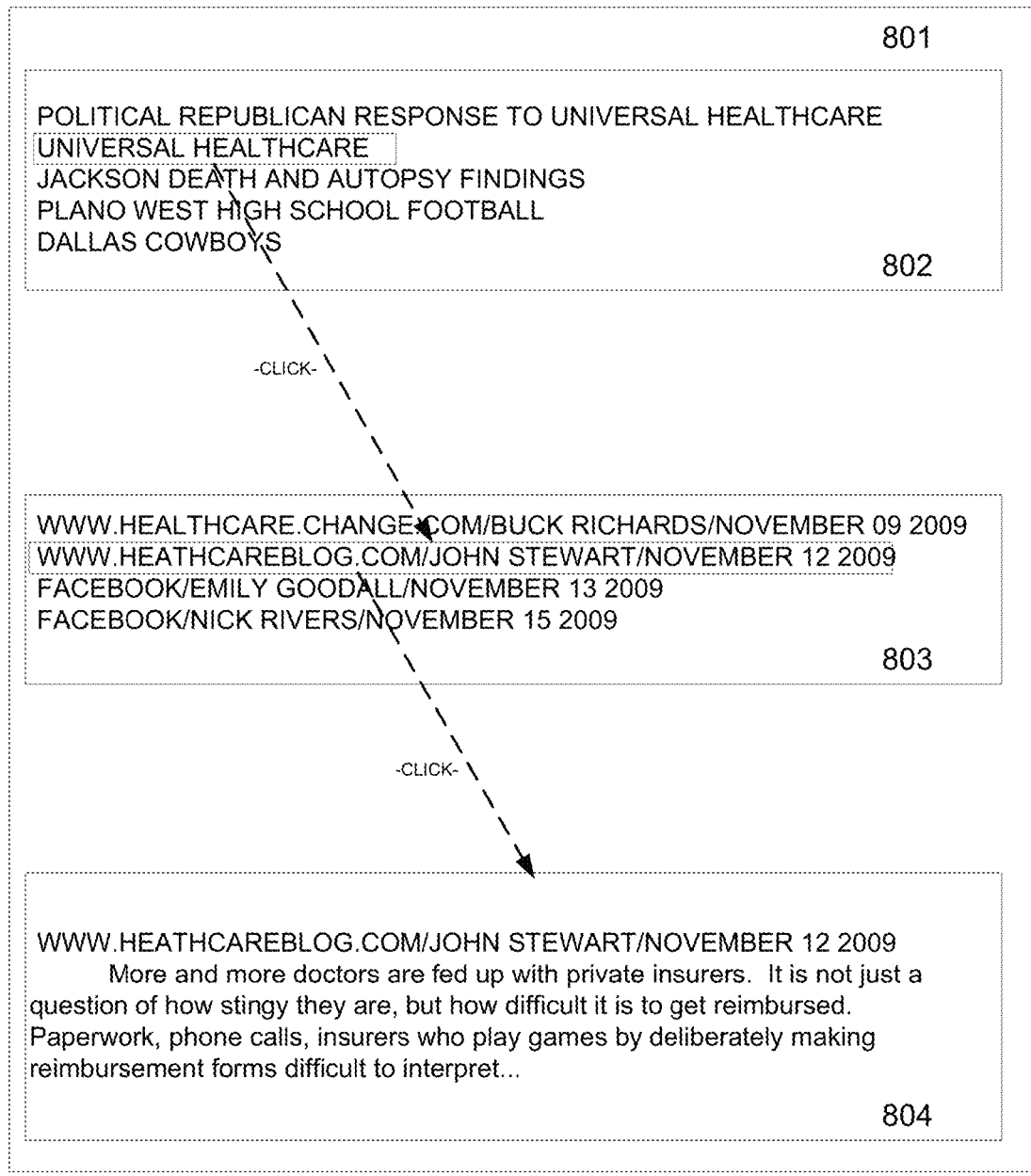
FIG. 8 illustrates a user interface for reviewing and expanding data results, according to example embodiments of the present invention.

FIG. 8 illustrates the functionality of selecting and expanding the GUI to view the details 801 of author-originated information messages, according to example embodiments of the present invention. The categories existing in the PDF are listed in a first window or GUI 802. For example, Political Republican Response to Universal Healthcare, Universal Healthcare, etc. The user is able to interact with the window, expanding into each of the specific categories to obtain as much information as necessary.

The first window 802 is a listing of all of the categories in the application presented to the user based on user defined search settings and topic information. The user may click on a specific category listed in window 802, and, as a result will be presented with another window 803 that lists all of the entries within that category. The entries list the website of where the entry was found, the author of the entry, and the date that the entry was submitted to the site.

The user may then click on an entry in the list and will be presented with yet another window 804 that displays the entire message. Window 804 may include additional buttons allowing navigation and interaction with the user entry or entries. Additional features and functionality may be placed into the application allowing the user to respond to any of the messages. The user is capable of examining the various topics he or she has pre-selected as topics of interest. A single user interface may provide access to various different topics, which may be recent, relevant to the user's search criteria and may be easily expanded for further research and review by the user in real-time.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components 104, 106, 108, 110, 112, 114 and 116.

Figure 9:
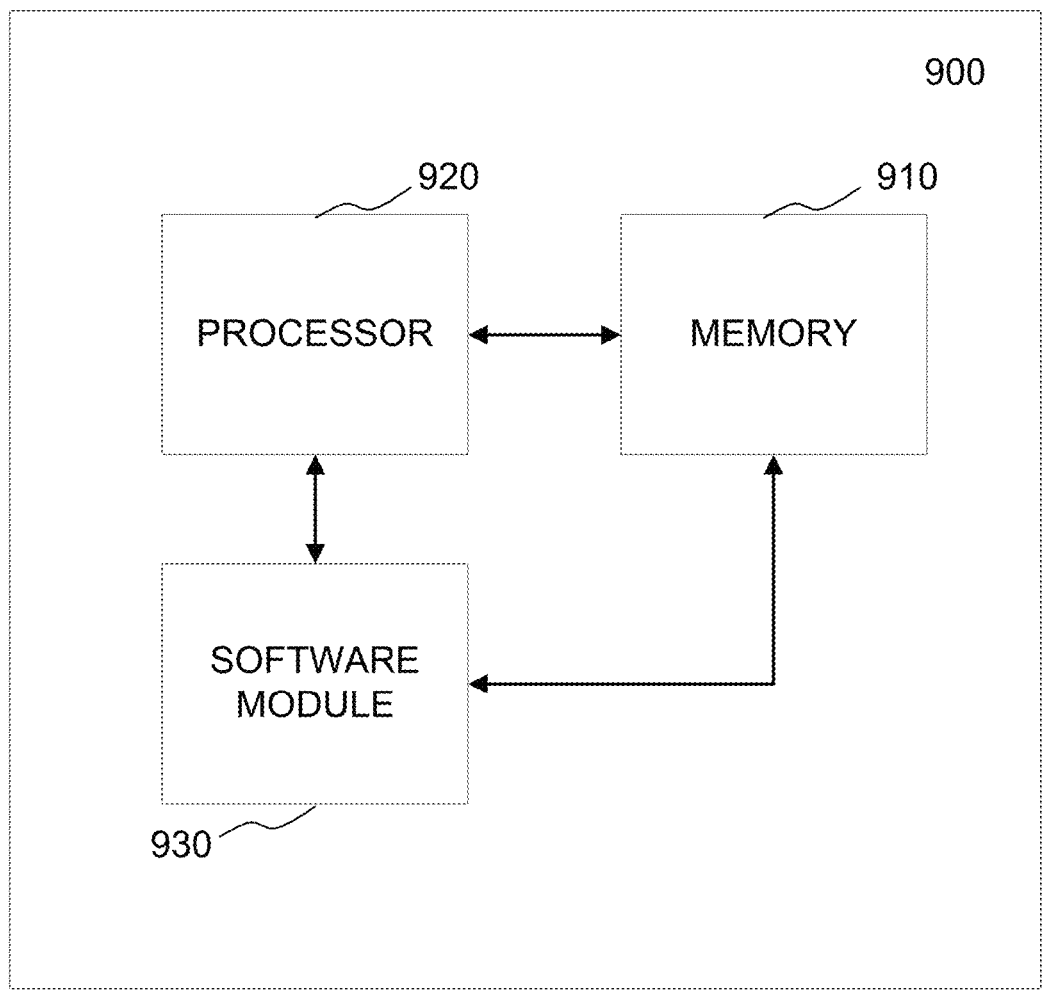
FIG. 9 illustrates a network entity that may be used to perform the features associated with example embodiments of the present invention.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Figure 10:
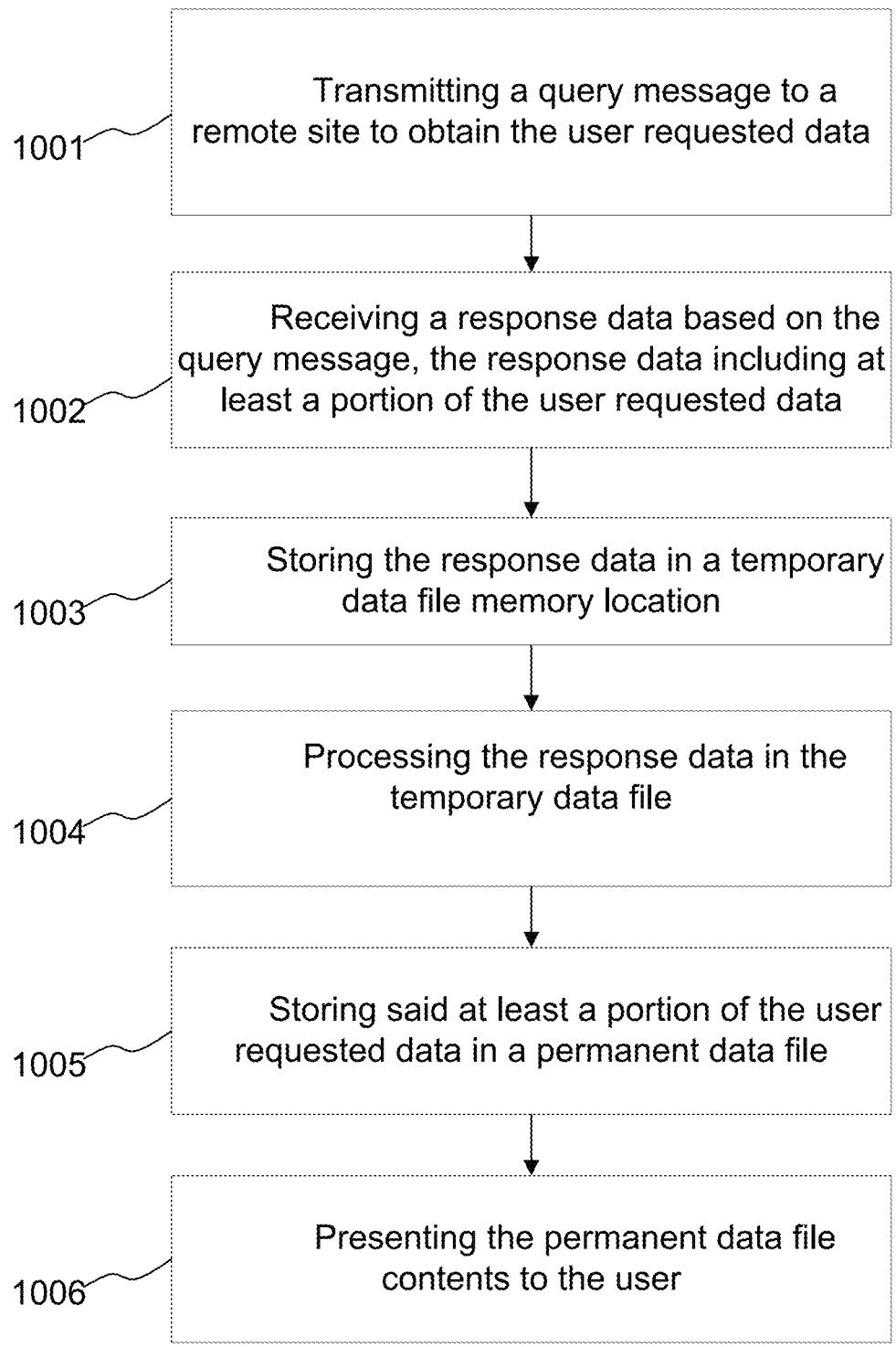
FIG. 10 illustrates an example method flow diagram example, according to example embodiments of the present invention.

One example embodiment of the present invention may include a method of organizing user requested data, as illustrated in FIG. 10. Referring to FIG. 10, The method may include transmitting a query message to a remote site to obtain the user requested data, at operation 1001. The method may also include receiving a response data based on the query message, the response data including at least a portion of the user requested data, at operation 1002 and storing the response data in a temporary data file memory location, at operation 1003. The method may also include processing the response data in the temporary data file, at operation 1004, storing said at least a portion of the user requested data in a permanent data file, at operation 1005 and presenting the permanent data file contents to the user, at operation 1006.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
receiving a query message at a remote site device to obtain requested data;
transmitting response data from the remote site device based on the query message, the response data including at least a portion of the requested data;
processing the response data in a temporary data file as a plurality of data messages and determining search relevancy between content of the data messages and content of the query message;
storing said at least a portion of the requested data in a permanent data file and assigning weights to the data messages stored in the permanent data file indicating the search relevancy determined from the processing of the plurality of data messages, wherein the weights of each of the data messages correspond to a particular category and are assigned and incremented to a certain value proportional to a frequency of the particular category being identified in each of the data messages; and
presenting the permanent data file contents to a computing device.

2. The method of claim 1, wherein more weights are assigned to the requested data which includes more instances of predefined search requirements.

3. The method of claim 2, wherein the predefined user search requirements are keywords.

4. The method of claim 1, further comprising:
determining whether an amount of time has expired prior to sending the query message.

5. The method of claim 1, further comprising:
transmitting the query message from the computing device to the remote site device; and
formatting the query message into a specific format to accommodate the remote site format requirements prior to transmitting the query message.

6. The method of claim 1, wherein presenting the permanent data file contents to the computing device further comprises presenting options to select one of a plurality of displayed messages and expand the message contents to view original data contents of a selected message.

7. The method of claim 1, wherein the site is at least one of a website server and a remote database server.

8. An apparatus, comprising:
a receiver configured to receive a query message to obtain requested data at a remote device
a transmitter configured to transmit response data based on the query message, the response data including at least a portion of the requested data; and
a processor configured to process the response data in a temporary data file and determine search relevancy between content of the data messages and content of the query message, store said at least a portion of the requested data in a permanent data file, and assign weights to the data messages stored in the permanent data file that indicates the search relevancy determined from a plurality of processed data messages related to the response data, wherein the weights of each of the data messages correspond to a particular category and are assigned and incremented to a certain value proportional to a frequency of the particular category being identified in each of the data messages, and present the permanent data file contents to a computing device.

9. The apparatus of claim 8, wherein more weights are assigned to the user requested data which includes more instances of predefined search requirements.

10. The apparatus of claim 9, wherein the predefined user search requirements are keywords.

11. The apparatus of claim 8, wherein the processor is further configured to determine whether an amount of time has expired prior to the query message being sent.

12. The apparatus of claim 8, wherein the transmitter is further configured to transmit the query message to the remote site to obtain the requested data, wherein the processor is further configured to format the query message into a specific format to accommodate the remote site format requirements prior to the query message being transmitted.

13. The apparatus of claim 8, wherein presenting the permanent data file contents to the user further comprises presenting options to the computing device to select one of a plurality of displayed messages and expand the message contents to view original data contents of the selected message.

14. The apparatus of claim 8, wherein the site is at least one of a website server and a remote database server.

15. A non-transitory computer readable storage medium configured to store a computer program that when executed causes a processor to perform:
receiving a query message at a remote site device to obtain requested data;
transmitting a response data based on the query message, the response data including at least a portion of the requested data;
storing the response data in a temporary data file memory location;
processing the response data in the temporary data file as a plurality of data messages and determining search relevancy between content of the data messages and content of the query message;
storing said at least a portion of the requested data in a permanent data file and assigning weights to the data messages stored in the permanent data file indicating the search relevancy determined from the processing of the plurality of data messages, wherein the weights of each of the data messages correspond to a particular category and are assigned and incremented to a certain value proportional to a frequency of the particular category being identified in each of the data messages; and presenting the permanent data file contents to a computing device.

16. The non-transitory computer readable storage medium of claim 15, wherein more weights are assigned to the user requested data which includes more instances of predefined search requirements.

17. The non-transitory computer readable storage medium of claim 16, wherein the predefined user search requirements are keywords.

18. The non-transitory computer readable storage medium of claim 15, further comprising:
   determining whether an amount of time has expired prior to sending the query message.

19. The non-transitory computer readable storage medium of claim 15, further comprising:
   transmitting the query message from the computing device to the remote site device; and
   formatting the query message into a specific format to accommodate the remote site format requirements prior to transmitting the query message.

20. The non-transitory computer readable storage medium of claim 15, wherein presenting the permanent data file contents to the computing device further comprises presenting options to select one of a plurality of displayed messages and expand the message contents to view original data contents of a selected message.

* * * * *